(12) United States Patent
Chen et al.

(10) Patent No.: US 8,823,348 B2
(45) Date of Patent: Sep. 2, 2014

(54) BUCK COVERTER WITH OVERCURRENT PROTECTION FUNCTION

(71) Applicants: Yu-Jen Chen, New Taipei (TW); Chun-Yuan Tien, New Taipei (TW); Fan-Chin Kung, New Taipei (TW); Chun-Po Chen, New Taipei (TW); Chia-Ming Yeh, New Taipei (TW)

(72) Inventors: Yu-Jen Chen, New Taipei (TW); Chun-Yuan Tien, New Taipei (TW); Fan-Chin Kung, New Taipei (TW); Chun-Po Chen, New Taipei (TW); Chia-Ming Yeh, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 87 days.

(21) Appl. No.: 13/655,401

(22) Filed: Oct. 18, 2012

(65) Prior Publication Data
US 2013/0141061 A1 Jun. 6, 2013

(30) Foreign Application Priority Data
Dec. 5, 2011 (TW) .............................. 100222956 A

(51) Int. Cl.
G05F 1/00 (2006.01)
(52) U.S. Cl.
USPC ......................................... 323/282; 323/285

(58) Field of Classification Search
USPC .................................................. 323/282, 285
See application file for complete search history.

(56) References Cited

U.S. PATENT DOCUMENTS

| 7,358,710 B2* | 4/2008 | Luo et al. ........................ 323/282 |
| 8,072,200 B1* | 12/2011 | Qiu et al. ....................... 323/282 |
| 2008/0309608 A1* | 12/2008 | Shen et al. .................... 323/285 |

* cited by examiner

Primary Examiner — Jue Zhang
(74) Attorney, Agent, or Firm — Novak Druce Connolly Bove + Quigg LLP

(57) ABSTRACT

A buck converter configured for converting a voltage output from a power supply to a load includes a first switch, a second switch, an inductor, three compensators and a control microchip. The first switch and the second switch are connected in series between two ends of the power supply. A first end of the inductor is connected to a node between the first switch and the second switch; a second end of the inductor serves as an output terminal connected to the load. The compensators are correspondingly connected to the first switch, the second switch and the inductor. The control microchip is electrically connected to the first and second switches and the node. The control microchip controls the first and second switches to turn on or off, and executes a current protective process when output current of the output terminal exceeds a current protective threshold of the load.

11 Claims, 1 Drawing Sheet

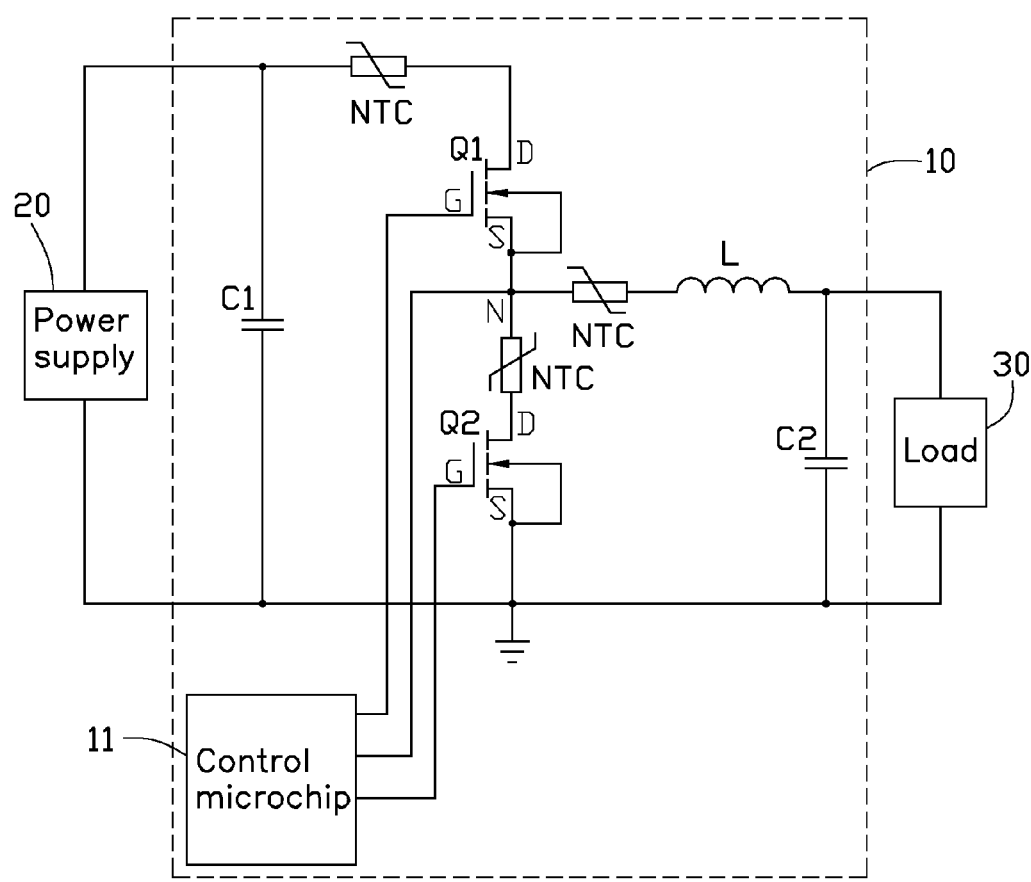

BUCK COVERTER WITH OVERCURRENT PROTECTION FUNCTION

BACKGROUND

1. Technical Field

The disclosure generally relates to buck converters, and particularly to a buck converter with an overcurrent protection function.

2. Description of Related Art

A buck converter commonly has an overcurrent protection function to prevent a load connected to the buck converter from being damaged due to overcurrent input into the load. The buck converter usually includes a pulse-width modulation (PWM) controller. The PWM controller detects an output voltage of the buck converter, compares the detected output voltages with a corresponding preset voltage, and determines whether a corresponding output current of the buck converter is greater than a current protective threshold of the load according to the comparison.

However, the output voltage of the buck converter is based on an ideal state that resistances of electronic elements, such as switches and an inductor of the buck converter, are unchangeable. Actually, the electronic elements of the buck converter have reversible temperature coefficients. That is the resistances of the electronic elements increase as the temperature increases. When the temperature is high, the detected voltage is greater than the preset voltage because of the actually increased resistances of the electronic elements. Therefore, although the output current does not exceed the current protective threshold, the PWM controller may mistakenly determine the output current is greater than the current protective threshold and execute an unnecessary protective process.

Therefore, there is room for improvement within the art.

BRIEF DESCRIPTION OF THE DRAWING

Many aspects of the present disclosure can be better understood with reference to the following drawing. The components in the drawing are not necessarily drawn to scale, the emphasis instead being placed upon clearly illustrating the principles of the disclosure.

The FIGURE is a circuit diagram of a buck converter used to convert a voltage output from a power supply into a rated voltage for a load, according to an exemplary embodiment of the disclosure.

DETAILED DESCRIPTION

The FIGURE is circuit diagram of a buck converter 10 that converts a voltage output from a power supply 20 into a rated voltage for a load 30, according to an exemplary embodiment of the disclosure. The buck converter 10 includes a first capacitor C1, a first switch Q1, a second switch Q2, an inductor L, a second capacitor C2, a control microchip 11, and a plurality of compensators NTC. In one exemplary embodiment, the buck converter 10 includes three compensators NTC which are resistors having negative temperature coefficients respectively corresponding to the first switch Q1, the second switch Q2, and the inductor L.

The first capacitor C1 is electrically connected to two ends of the power supply 20 and is in parallel with the power supply 20. The first capacitor C1 is configured for blocking direct current part of the power supply 20, and can be omitted in some embodiments.

The first switch Q1 and the second switch Q2 are electrically connected in series between the two ends of the power supply 20, and connected to the first capacitor C1 in series. The first switch Q1 and the second switch Q2 are also electrically connected to the control microchip 11 and can be controlled to turn on or off by the control microchip 11.

In one exemplary embodiment, the first switch Q1 and the second switch Q2 are metal-oxide-semiconductor field-effect transistors (MOSFETs). A gate G of the first switch Q1 is electrically connected to the control microchip 11. A drain D of the first switch Q1 is electrically connected to one end of the power supply 20. A source S of the first switch Q1 is electrically connected to the second switch Q2.

A gate G of the second switch Q2 is electrically connected to the control microchip 11. A drain D of the second switch Q2 is electrically connected to the source of the first switch Q1 and forms a node N between the first switch Q1 and the second switch Q2. A source S of the second switch Q2 is electrically connected to the other end of the power supply 20 and also grounded.

A first end of the inductor L is electrically connected to the control microchip 11 by the node N. A second end of the inductor L is served as an output terminal. The load 30 is electrically connected between the output terminal and ground. The second capacitor C2 is electrically connected to two ends of the load 30 and is in parallel with the power supply 20.

The control microchip 11 may be a PWM controller. The control microchip 11 controls the first switch Q1 and the second switch Q2 to turn on or off.

The control microchip 11 further detects voltages of the first switch Q1, the second switch Q2 and the inductor L when the first switch Q1 and the second switch Q2 are turned on. Voltages of the first switch Q1, the second switch Q2 and the inductor L corresponding to a current protective threshold of the load are preset in the control microchip 11. The control microchip 11 compares the detected voltages with the corresponding preset voltages and determines whether the output current exceeds the current protective threshold.

The compensators NTC are resistors having negative temperature coefficients. In one exemplary embodiment, the compensator NTC corresponding to the first switch Q1 is electrically connected between the drain D of the first switch Q1 and the power supply 20. The compensator NTC corresponding to the second switch Q2 is electrically connected between the drain D of the second switch Q2 and the node N. The compensator NTC corresponding to the inductor L is electrically connected between the inductor L and the node N. When the temperature is increased, resistances of the first switch Q1, the second switch Q2 and the inductor L are increased, and resistances of the compensators NTC are reduced. Thus, the reduced resistances of the compensators NTC offset the increased resistances of the first switch Q1, the second switch Q2 and the inductor L to maintain a resistance of the buck converter 10 to be unchanged.

In other embodiment, the compensator NTC corresponding to the second switch Q2 can be electrically connected between the source S of the second switch Q2 and the control microchip 11. The compensator NTC corresponding to the inductor L can be electrically connected between the inductor L and the load 30.

The buck converter 10 uses the compensators NTC to reduce influences of the temperature on the first switch Q1, the second switch Q2, and the inductor L. Therefore, the buck converter 10 can effectively avoid a mistaken determination about the output current and also avoid executing an unnecessary protective process.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A buck converter configured for converting a voltage output from a power supply to a load, the buck converter comprising:
   a first switch and a second switch connected in series between two ends of the power supply;
   an inductor, a first end of the inductor connected to a node, a second end of the inductor served as an output terminal and connected to the load, the node being between the first switch and the second switch;
   three compensators corresponding to the first switch, the second switch, and the inductor, the three compensators respectively connected to the first switch, the second switch and the inductor in series;
   a control microchip connected to the first switch, the second switch, and the node, the control microchip controlling the first switch and the second switch to turn on or off, and executing a current protective process when output current of the output terminal exceeds a current protective threshold of the load; and
   wherein the first switch, the second switch, and the inductor have reversible temperature coefficients and the compensators have negative temperature coefficients.

2. The buck converter of claim 1, wherein the first switch and the second switch are metal-oxide-semiconductor field-effect transistor (MOSFETs), a gate of the first switch is electrically connected to the control microchip, a drain of the first switch is electrically connected to one end of the power supply, a source of the first switch is electrically connected to a drain of the second switch; a gate of the second switch is electrically connected to the control microchip, and a source of the second switch is electrically connected to the other end of the power supply and also grounded.

3. The buck converter of claim 2, wherein the compensator corresponding to the first switch is electrically connected between the drain of the first switch and the power supply; the compensator corresponding to the second switch is electrically connected between the drain of the second switch and the node; the compensator corresponding to the inductor is electrically connected between the inductor and the node.

4. The buck converter of claim 2, wherein the compensator corresponding to the first switch is electrically connected between the drain of the first switch and the power supply; the compensator corresponding to the second switch is electrically connected between the source of the second switch and the control microchip; the compensator corresponding to the inductor is electrically connected between the inductor and the load.

5. The buck converter of claim 1, wherein the control microchip detects voltages of the first switch, the second switch and the inductor when the first switch and the second switch are turned on, compares the detected voltages with corresponding preset voltages, and executes the current protective process according to the comparison result.

6. A buck converter configured for converting a voltage output from a power supply to a load, the buck converter comprising:
   a first switch and a second switch connected in series between two ends of the power supply;
   an inductor, a first end of the inductor connecting to a node, a second end of the inductor served as an output terminal and connected to the load, the node being between the first switch and the second switch;
   a plurality of compensators corresponding to the first switch, the second switch and the inductor and respectively connected to the first switch, the second switch and the inductor in series, the compensators maintaining resistances of the first switch, resistances of the second switch and the inductor to be unchangeable with temperature; and
   a control microchip connected to the first switch, the second switch and the node, the control microchip controlling the first switch and the second switch to turn on or off, and executing a current protective process when output current of the output terminal exceeds a current protective threshold of the load.

7. The buck converter of claim 6, wherein the first switch, the second switch and the inductor have reversible temperature coefficients and the compensators have negative temperature coefficients.

8. The buck converter of claim 6, wherein the first switch and the second switch are metal-oxide-semiconductor field-effect transistor (MOSFETs), a gate of the first switch is electrically connected to the control microchip, a drain of the first switch is electrically connected to a first end of the power supply, a source of the first switch is electrically connected to a drain of the second switch; a gate of the second switch is electrically connected to the control microchip, a source of the second switch is electrically connected to a second end of the power supply and also grounded.

9. The buck converter of claim 8, wherein the compensator corresponding to the first switch is electrically connected between the drain of the first switch and the power supply; the compensator corresponding to the second switch is electrically connected between the drain of the second switch and the node; the compensator corresponding to the inductor is electrically connected between the inductor and the node.

10. The buck converter of claim 8, wherein the compensator corresponding to the first switch is electrically connected between the drain of the first switch and the power supply; the compensator corresponding to the second switch is electrically connected between the source of the second switch and the control microchip; the compensator corresponding to the inductor is electrically connected between the inductor and the load.

11. The buck converter of claim 6, wherein the control microchip detects voltages of the first switch, the second switch and the inductor when the first switch and the second switch are turned on, compares the detected voltages with corresponding preset voltages, and executes the current protective process according to the comparison result.

* * * * *